United States Patent
Ono et al.

(10) Patent No.: US 7,704,591 B2
(45) Date of Patent: Apr. 27, 2010

(54) COVER TAPE AND CARRIER TAPE SYSTEM

(75) Inventors: Takeshi Ono, Isezaki (JP); Masanori Higano, Isezaki (JP); Masanori Ishii, Isezaki (JP); Takayuki Iwasaki, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 96 days.

(21) Appl. No.: 10/592,091

(22) PCT Filed: Apr. 25, 2005

(86) PCT No.: PCT/JP2005/007842

§ 371 (c)(1),
(2), (4) Date: Sep. 7, 2006

(87) PCT Pub. No.: WO2005/102860

PCT Pub. Date: Nov. 3, 2005

(65) Prior Publication Data

US 2007/0184243 A1 Aug. 9, 2007

(30) Foreign Application Priority Data

Apr. 26, 2004 (JP) ............................. 2004-129131
Jun. 23, 2004 (JP) ............................. 2004-185262
Oct. 22, 2004 (JP) ............................. 2004-307675

(51) Int. Cl.
*B32B 27/32* (2006.01)
*G11B 5/64* (2006.01)

(52) U.S. Cl. ........................ 428/212; 428/141; 428/332; 428/409; 428/500; 428/521

(58) Field of Classification Search ............... 428/212, 428/141, 332, 409, 500, 521
See application file for complete search history.

(56) References Cited

U.S. PATENT DOCUMENTS

| | | | | |
|---|---|---|---|---|
| 4,929,486 A | * | 5/1990 | Itou et al. | 428/77 |
| 5,851,615 A | * | 12/1998 | Kay | 428/40.1 |
| 6,024,895 A | * | 2/2000 | Shimizu et al. | 252/500 |
| 6,902,791 B2 | * | 6/2005 | Kawasato et al. | 428/141 |
| 2004/0040886 A1 | | 3/2004 | Tellkamp et al. | |

FOREIGN PATENT DOCUMENTS

| | | |
|---|---|---|
| JP | 3001281 | 6/1994 |
| JP | 8 91474 | 4/1996 |
| JP | 2001 179870 | 7/2001 |
| JP | 2002 211677 | 7/2002 |
| JP | 2003 512207 | 4/2003 |
| JP | 2004-051144 | 2/2004 |
| JP | 2005-225548 | 8/2005 |

OTHER PUBLICATIONS

Hiroki et al, JP 2002-211677 machine translation, Jul. 31, 2002, whole document.*
Thomson Scientific, London, GB; AN 1995-277503 XP 002483965 &JP 07 172463 A (Sumitomo Bakelite Co Ltd) Jul. 11, 1995 abstract.

* cited by examiner

*Primary Examiner*—David R Sample
*Assistant Examiner*—Lawrence D Ferguson
(74) *Attorney, Agent, or Firm*—Oblon, Spivak, McClelland, Maier & Neustadt, L.L.P.

(57) ABSTRACT

A cover tape comprising at least a substrate layer and a heat sealing layer, wherein (1) an antistatic layer containing an antistatic agent and an anticorrosive agent, is formed on the heat sealing layer, or (2) the heat sealing layer side has an average surface roughness (Ra) of from 0.3 to 1.0 μm, and has an antistatic agent applied thereon to form an antistatic layer.

6 Claims, No Drawings

COVER TAPE AND CARRIER TAPE SYSTEM

TECHNICAL FIELD

The present invention relates to a cover tape to be used for a cover material of a container for accommodating components having metal portions, and a carrier tape system for packaging electronic components, employing such a cover tape.

BACKGROUND ART

A carrier tape is commonly used for transporting electronic components such as IC. Namely, such electronic components are inserted in recesses for accommodating the electronic components, formed at prescribed distances on a carrier tape, and a cover tape having a readily peelable adhesive layer on a substrate, is heat-sealed on the upper side of the carrier tape thereby to seal in the electronic components, followed by being wound up and transported in a reel state. Such a cover tape is required to be transparent to such an extent that such electronic components can be inspected, and it is required to be easily and smoothly peeled from the carrier tape. Further, in a case where such electronic components are components susceptible to dielectric breakdown by static electricity, antistatic treatment is applied to one side or both sides of the cover tape to prevent deposition of dust or to protect the contents from static electricity, or to prevent such a trouble that when the cover tape is peeled from the carrier tape, such electronic components pop out as adhered to the cover tape.

For such antistatic treatment, a method may be employed wherein an antistatic agent is incorporated to a resin constituting the surface to be provided with an antistatic property, or a method wherein an antistatic agent is applied to such a surface. One having an antistatic agent applied to the surface of an adhesive layer is disclosed, for example, in Patent Documents 1 to 4.

By such methods, it is possible to obtain an antistatic effect. However, if a large amount of an antistatic agent is applied in order to obtain a sufficient effect, the sealing strength to the carrier tape tends to be unstable. Further, if left in a high temperature and high humidity environment, a metal portion of e.g. IC as the content is likely to be corroded. If a non-ionic antistatic agent is employed as the antistatic agent, the above-mentioned corrosion of the metal portion may decrease, but even in such a case, a very small amount of ions will be present, and depending upon the environmental conditions, corrosion of the metal portion tends to result, and an improvement in this respect has been desired.

On the other hand, a method has also been proposed wherein as the adhesive layer, fine particles of conductive metal are mixed to a thermally adhesive resin (e.g. Patent Documents 5 and 6). However, by such a method, the transparency of the cover tape deteriorates, thus leading to a problem that it becomes difficult to identify the shape, etc. of the content. Especially in a method of inspecting electronic components such as IC in recent years in which a defect such as a deformation of a pin of IC is photographed by a CCD camera from above the cover tape, followed by image analysis for its detection, the requirement for the transparency of the cover tape is increasingly high.

Patent Document 1: Japanese Patent 2901857
Patent Document 2: JP-A-11-115088
Patent document 3: JP-A-7-172463
Patent Document 4: JP-A-2001-171727
Patent Document 5: JP-A-7-251860

DISCLOSURE OF THE INVENTION

It is an object of the present invention to provide a cover tape to be used for a cover material of a container accommodating components having metal portions, and a carrier tape system for packaging electronic components employing such a cover tape, and more particularly to provide such a cover tape which is capable of sufficiently suppressing corrosion of the metal part of such an electronic component even in a high temperature and high humidity environment when such an electronic component is stored as accommodated and which has an excellent antistatic property and sufficient transparency so that the shape of the content can be identified by an image analysis through the cover tape, and a carrier tape system for packaging electronic components, employing such a cover tape.

The present inventors have conducted an extensive research and as a result, have found it possible to solve the above-mentioned problems by an invention having the following construction, which will be presented as the present invention.

(1) A cover tape comprising at least a substrate layer and a heat sealing layer, wherein (1) an antistatic layer containing an antistatic agent and an anticorrosive agent, is formed on the heat sealing layer, or (2) the heat sealing layer side has an average surface roughness (Ra) of from 0.3 to 1.0 μm, and has an antistatic agent applied thereon to form an antistatic layer.

(2) The cover tape according to the above (1), wherein the anticorrosive agent is a benzotriazole compound.

(3) The cover tape according to the above (1) or (2), wherein the antistatic layer contains (a) an amphoteric ion surfactant quaternary ammonium salt, (b) a polyoxyethylene alkyl ether and (c) a benzotriazole compound.

(4) The cover tape according to the above (3), wherein the antistatic layer contains from 20 to 70 mass % of the component (a), from 1 to 10 mass % of the component (b) and from 10 to 40 mass % of the component (c).

(5) The cover tape according to the above (1), which is a laminated film comprising a substrate layer having a thickness of from 5 to 30 μm, an interlayer composed mainly of a polyethylene resin and having a thickness of from 5 to 25 μm, a support layer composed mainly of a polyolefin resin and having a thickness of from 5 to 25 μm and a heat sealing layer having a thickness of from 5 to 20 μm, wherein the average surface roughness (Ra) on the heat sealing layer side is from 0.3 to 1.0 μm, and an antistatic agent is applied on the heat sealing layer to form the antistatic layer.

(6) The cover tape according to the above (5), wherein the heat sealing layer is made of a thermoplastic composition comprising an ethylene polymer (A), a styrene-butadiene copolymer (B) and an impact resistant polystyrene (C).

(7) The cover tape according to the above (5) or (6), wherein the thickness of the antistatic layer formed on the heat sealing layer is from 0.01 to 0.2 μm.

(8) The cover tape according to any one of the above (5) to (7), wherein the surface resistivity of the surface on the heat sealing layer side is at most $1 \times 10^{12} \Omega/\square$.

(9) A carrier tape system for packaging electronic components, employing the cover tape as defined in any one of the above (1) to (8).

(10) A carrier tape system for packaging chip type electronic components, employing the cover tape as defined in any one of above (1) to (8).

(11) A cover tape for a carrier tape for packaging electronic components, employing the cover tape as defined in any one of above (5) to (8).

EFFECT OF THE INVENTION

The cover tape of the present invention has a proper peel strength against the carrier tape and can easily be peeled from the carrier tape, when the electronic components are to be taken out. Further, its transparency is good, whereby the shape of the content can easily be confirmed. Further, it has a sufficient antistatic effect, and even when electronic components having metal portions are accommodated in a high temperature high humidity environment for a long period of time, it is possible to sufficiently suppress corrosion of the electronic components.

BEST MODE FOR CARRYING OUT THE INVENTION

The cover tape of the present invention comprises at least a substrate layer and a readily peelable heat sealing layer. Here, "comprising" means that the cover tape may have a double layer structure of substrate layer/heat sealing layer or a multilayer structure such as substrate layer comprising two or more layers of different materials laminated/heat sealing layer.

Irrespective of whether the substrate layer is a single layer or of a multilayer structure of two or more layers, the substrate layer is a film made of one or more thermoplastic resins selected from a polyester resin such as polyethylene terephthalate or polyethylene naphthalate, a polyolefin resin such as polypropylene, a polyamide resin such as nylon, a polystyrene resin, a polyethylene resin, and a polycarbonate resin. Further, a biaxially stretched film of such a resin can be suitably employed, and further, a commercially available film may be employed. Particularly preferred is a biaxially stretched polyethylene terephthalate film from the viewpoint of the transparency and toughness.

In the present invention, the polystyrene resin is a polymer containing styrene units in a molar ratio of at least ½ in the molecular chain, such as polystyrene, high impact polystyrene, a styrene/butadiene copolymer or its hydrogenated product, a styrene/isoprene copolymer or its hydrogenated product, a graft copolymer of styrene with ethylene, a styrene/butene/butadiene copolymer or a copolymer of methacrylic acid with styrene. For the substrate layer, one of them or a mixture of two or more of them may be employed.

Further, the polyethylene resin is one containing ethylene units in a molar ratio of at least ½ in its molecular chain, such as low density polyethylene, linear low density polyethylene, ultralow density polyethylene, an ethylene/α-olefin, an ethylene/vinyl acetate copolymer, an ethylene/acrylic acid copolymer, an ethylene/methyl acrylate copolymer, an ethylene/ethyl acrylate copolymer or an ethylene/propylene rubber. One of them or a mixture of two or more of them may be employed.

As the substrate layer of the present invention, a substrate layer of double layers, having a thermoplastic resin layer formed on such a film for a substrate layer, to enhance the bond strength between the film for a substrate layer and the heat sealing layer. Further, it may be a substrate layer having a three layer structure, for example, having a layer of a mixture comprising an ethylene/α-olefin and a styrene/ethyl/butadiene copolymer, laminated on the surface of such a substrate layer of laminated double layers.

The heat sealing layer is not particularly limited so long as it has a heat sealing property to the carrier tape, and it is made of a thermoplastic resin composition showing a readily peelable property so that it can be readily peelable during the use, irrespective of the substrate layer is a single layer or multilayers. It is particularly preferred to employ one or more, as a mixture, of various types of ethylene polymers such as a polyethylene resin, an ethylene/vinyl acetate copolymer, an ethylene/ethyl acrylate copolymer, an ethylene/α-olefin copolymer, an ethylene/butene-1 random copolymer and a styrene-g-ethylene polymer, and styrene polymers such as impact resistant polystyrene, a styrene/butadiene block copolymer, polystyrene, a styrene/ethylene/butadiene/styrene copolymer and a styrene/isoprene/butadiene/styrene copolymer, from such a viewpoint that when it is heat sealed to a carrier tape made of a styrene type resin composition, a proper peel strength can be obtained. Among them, particularly preferred is a combination of a styrene/butadiene block copolymer, an ethylene polymer and an impact resistant polyethylene, as one whereby at the time of peeling, the difference in peel strength is small, and smooth peeling can be attained.

In the heat sealing layer constituted by the resins as described above, it is preferred to employ a mixture comprising from 30 to 80 mass % of a styrene/butadiene block copolymer, from 15 to 60 mass % of an ethylene polymer resin and from 3 to 15 mass % of an impact resistant polystyrene resin, when the mixed resin is 100 mass %, from the viewpoint of the stability of the peel strength.

The cover tape having a single layered or multilayered substrate layer of the present invention has an antistatic layer containing an antistatic agent and an optional anticorrosive agent on the surface of the heat sealing layer. Such an antistatic layer may be formed not only on the heat sealing layer but also on the substrate layer. Such an antistatic layer may be formed, for example, by a method of adding a polymer antistatic agent such as an ionomer, a polyester ether copolymer or an ethylene oxide chain-g-polyacrylic acid, or a surfactant-type cationic, anionic, amphoteric or nonionic antistatic agent, if necessary together with an anticorrosive agent, to the resin for the heat sealing layer, or by a method of coating the surface of the heat sealing layer with a liquid (preferably an aqueous solution) obtained by diluting a cationic, anionic, amphoteric or nonionic water-soluble surfactant type antistatic agent or a polymer antistatic agent such as one having the above-mentioned hydrophilic groups bonded on a polymer chain, if necessary together with an anticorrosive agent, with a solvent such as water, by a common method such as spraying or by means of a kiss reverse coater, a rod coater or a microgravure coater, followed by drying. The thickness of such an antistatic layer is preferably from 0.01 to 0.2 μm. If it is less than 0.01 μm, no adequate antistatic property may be obtained, and if it exceeds 0.2 μm, an adverse effect to the heat sealing property, such as a decrease in the peel strength, may result. Further, in order to obtain a sufficient antistatic property, the surface resistivity is preferably at most $1 \times 10^{12} \Omega/\square$, particularly preferably at most $1 \times 10^{11} \Omega/\square$. If the surface resistivity exceeds $1 \times 10^{12} \Omega/\square$, no adequate antistatic performance may sometimes be obtained. From the viewpoint of the antistatic performance, the surface resistivity may be as low as possible, but it is not realistic to obtain less than $1 \times 10^{7} \Omega/\square$ by an addition of the antistatic agent.

The above-mentioned anticorrosive agent is not particularly limited so long as it can be uniformly dispersed or dissolved in the diluted liquid of the above antistatic agent with a solvent such as water. Particularly, a benzotriazole compound such as benzotriazole, or a benzotriazole derivative such as carboxybenzotriazole, is preferred as the anticorrosive agent to be used in the present invention, since a good effect can be obtained for corrosion prevention of a metal part of an electronic component, or it can be used as mixed with the above water-soluble antistatic agent and can be used without impairing the performance of the antistatic agent.

In the present invention, in a case where an antistatic layer containing an antistatic agent and an anticorrosive agent, is to be formed, the above-mentioned antistatic agent and anticorrosive agent may optionally be selected for use. For example, in a case where (a) an amphoteric ion surfactant quaternary ammonium salt and (b) a polyoxyethylene alkyl ether as antistatic agents, and (c) a benzotriazole compound as an anticorrosive agent, are used, a surface resistivity lower than other antistatic agents such as an alkyldiethanolamine, can be obtained by using (a) the amphoteric ion surfactant quaternary ammonium salt. Further, by using (c) the benzotriazole compound, corrosion of a metal portion of e.g. IC in contact with the heat sealing layer, can be suppressed, and by the presence of component (b), such suppressing effect will further be improved. In a case where other anticorrosive agents such as triazine type or propione type anticorrosive agents, are employed, no adequate anticorrosive effect or surface resistivity can be obtained.

Further, with respect to the blend ratio of the respective components (a), (b) and (c) in the antistatic layer, the component (a) is preferably from 20 to 70 mass %, based on the sum of the respective components. If it is less than 20 mass %, it tends to be difficult to obtain a surface resistivity to present a sufficient antistatic effect. If it exceeds 70 mass %, the viscosity is likely to increase in the coating step, thus leading to a trouble in uniform coating. On the other hand, the component (c) is preferably from 10 to 40 mass %. If it is less than 10 mass %, the above-mentioned effect for suppressing corrosion of the metal is likely to be inadequate, and if it exceeds 40 mass %, it tends to be difficult to obtain a sufficient peel strength when the cover tape is heat-sealed with a carrier tape. The component (b) is preferably from 1 to 10 mass %. If it is less than 1 mass %, the effect for enhancing the anticorrosive effect of the component (c) may not be obtained, and if it exceeds 10 mass %, it tends to be difficult to obtain a sufficient peel strength when the cover tape is heat-sealed with the carrier tape. Further, the antistatic layer may contain other surfactants such as an alkyl betaine in addition to the components (a), (b) and (c), unless they impair the effects of the present invention.

The cover tape of the present invention preferably has a surface roughness on the heat sealing layer side of from 0.3 to 1.0 µm as an average surface roughness Ra as measured in accordance with JIS B-0651. More preferably, Ra is from 0.4 to 0.6 µm. When Ra of the heat sealing layer is at least 0.3 µm, corrosion of the metal portion will not take place even if the antistatic agent contained in the heat sealing layer bleeds out on the surface of the heat sealing layer when stored in a high temperature high humidity environment for a long period of time. If it is less than 0.3 µm, it tends to be difficult to obtain a sufficient effect to suppress corrosion of the metal portion of the content, when the content having the metal portion such as IC is put in a carrier tape and sealed with this cover tape and stored in a high temperature high humidity environment for a long period of time. The reason is not clearly understood, but as a result of an extensive study of a means to solve the above-mentioned problem of corrosion of a metal, it is considered that by controlling the surface roughness of the heat sealing layer to be at least 0.3 µm, the substantial contact area with the electronic component as the content will be small, which is somehow influential. If Ra exceeds 1.0 µm, the haze is likely to exceed 30% when the substrate layer has a multilayer structure, whereby the transparency of the cover tape will be impaired, and it tends to be difficult to identify the shape of the content when an electronic component or the like is sealed in.

The entire thickness of the cover tape of the present invention is from 40 to 75 µm. If it is less than 40 µm, the cover tape is likely to break when it is peeled at a high speed. If it exceeds 75 µm, the volume after the cover tape is heat-sealed with the carrier tape, and the amount which can be would up in one reel will be smaller, whereby the production efficiency deteriorates.

In a case where the cover tape has a layered structure comprising a multilayered substrate layer, a heat sealing layer and an antistatic layer, the cover tape of the present invention is preferably one having a layer structure comprising a substrate layer, an interlayer, a support layer and a heat sealing layer. Particularly, it is preferably a laminated film comprising a substrate layer having a thickness of from 5 to 30 µm, an interlayer composed mainly of a polyethylene resin and having a thickness of from 5 to 25 µm, a support layer composed mainly of a polyolefin resin and having a thickness of from 5 to 25 µm, and a heat sealing layer having a thickness of from 5 to 20 µm.

For the substrate layer, the above-mentioned thermoplastic resin may be used, and the surface on the side in contact with the interlayer may be subjected to surface treatment such as sand blasting treatment, corona discharge treatment and/or plasma treatment in order to reinforce and stabilize the bond strength to the after-mentioned interlayer. Further, an antistatic agent may be incorporated to the substrate layer, or an antistatic product having the surface coated with an antistatic agent may be employed. The thickness of the substrate layer is usually from 5 to 30 µm to attain high transparency.

For the heat sealing layer on the side opposite to the substrate layer of the laminated film, a thermoplastic resin may be employed, and its thickness is usually from 5 to 20 µm. If it is less than 5 µm, no adequate peel strength will be obtained, when heat-sealed. If it exceeds 20 µm, it tends to be difficult to obtain sufficient transparency, which is one of the characteristics of the present invention.

The thickness of such a heat sealing layer is required to be at most 20 µm from the viewpoint of the transparency. However, the heat sealing layer itself is soft, and it is very difficult to form a film in this thickness, and it is difficult to obtain a constant peel strength when the cover tape is heat-sealed to a carrier tape. Therefore, the cover tape of the present invention has a support layer to support such a heat sealing layer, and by the presence of such a support layer, a constant peel strength can be obtained.

This support layer is composed mainly of a polyolefin resin and is not particularly limited so long as it is a polyolefin resin having good transparency. For example, a mixture of an ethylene/α-olefin random copolymer and a low density polyethylene, an ethylene/vinyl acetate copolymer, an ethylene/an acrylate copolymer, an ethylene/maleic acid copolymer, a propylene polymer, and a mixture thereof, may be mentioned. Among them, a mixture of an ethylene/butene-1 random copolymer and a low density polyethylene is preferred from the viewpoint of transparency, flexibility and adhesion to the heat sealing layer, and more preferred is a mixture wherein the ratio of the ethylene/butene-1 random copolymer to 100 parts by mass of such a mixture, is from 20 to 80 parts by mass.

The thickness of such a support layer is within a range of from 5 to 25 µm. If it is less than 5 µm, the effect to support the heat sealing layer tends to be inadequate. If it exceeds 25 µm, no further increase will be obtainable in the effect to support the heat sealing layer, and on the other hand, the total thickness of the cover tape tends to be too thick, whereby the flexibility tends to deteriorate.

In order to make the bond strength between the substrate layer and the above support layer firm and constant, the cover tape of the present invention has an interlayer made of a polyethylene resin between these layers. As such a polyethylene resin, one or more, as a mixture, of a linear low density polyethylene, an ultralow density polyethylene, an ethylene/1-butene copolymer and an ethylene/(meth)acrylate copolymer may be employed. The thickness of such an interlayer is usually from 5 to 25 µm. If it is less than 5 µm, no adequate effect for stabilizing the above-mentioned bond strength may be obtained, and if it exceeds 25 µm, no further improvement in the effect will be obtained, and the total thickness of the cover tape tends to be too thick, whereby the flexibility tends to deteriorate.

In the present invention, as a method for preparing the substrate layer having a multilayer structure, films of the respective layers may be laminated by using a common dry laminating method or extrusion laminating method. At the time of such lamination, it is possible to employ an adhesive such as an isocyanate adhesive or an ethyleneimine adhesive which is commonly used to enhance the adhesive strength between the respective layers. Such an adhesive layer preferably has a thickness of at most 5 µm. If it exceeds 5 µm, the tensile elastic modulus of the substrate layer tends to be high, whereby the handling efficiency tends to deteriorate.

In each layer of the substrate layer of the present invention, various additives such as an antioxidant and a lubricant which are commonly used to obtain extrusion stability at the time of forming a film, may be added within a range not to impair the properties of the substrate layer.

The heat sealing layer of the present invention may be formed by a common method. For example, it may be formed by a method of forming a film by inflation molding or extrusion molding such as T-die extrusion, a method of dissolving the above-mentioned resin such as a polyethylene resin, an ethylene polymer, an impact resistant polyethylene or a styrene polymer in a solvent, followed by coating, and a method of coating in the form of an aqueous emulsion. In a case where a film is formed by extrusion molding, as a soft resin having a small tensile elastic modulus is extruded, it is preferred to carry out coextrusion by using a resin having a high extrusion stability suitable for the above-mentioned support layer, in order to increase the extrusion stability.

The film for a heat sealing layer obtained by the above extrusion molding may be laminated with the substrate layer by a common method such as dry lamination or extrusion lamination to obtain a cover tape. Further, in order to suppress the adhesion (blocking phenomenon) between the heat sealing layer and the substrate layer, a filler as a blocking preventing agent may be added within a range not to impair the transparency. On the other hand, the surface roughness of the heat sealing layer may be adjusted by the withdrawing roll at the time of withdrawing the extruded film.

On the other hand, as a method for preparing the above-mentioned cover tape having a layered structure comprising a substrate layer, an interlayer, a support layer and a heat sealing layer, the above-mentioned common method may be employed. However, it is difficult to form a film having a thickness of from 5 to 15 µm like a heat sealing layer as a single layer to have a uniform thickness. Accordingly, it is effective to employ a method wherein a support layer and a heat sealing layer are formed as a laminated film by a T-die coextrusion method or a coextrusion inflation method employing e.g. a multimanifold or a feed block. It is effective to laminate such a laminated film on a substrate layer so that the support layer side will be the lamination side via a melt-extruded polyethylene resin by sandwich lamination. Further, a method is also effective wherein a film comprising an interlayer, a support layer and a heat sealing layer is prepared by a common three-layer coextrusion, and the support layer side surface of such a three layered film is laminated on the substrate layer by a common dry lamination method.

The cover tape of the present invention may, for example, be used as a cover tape for transporting electronic components to cover the upper side of recesses of an embossed tape to accommodate electronic components, wherein the recesses for accommodating electronic components are formed at predetermined distances in the longitudinal direction at the center portion in the width direction, and such a covered emboss tape is used as a carrier tape for transporting electronic components. The embossed tape is one formed from a sheet product molded to have pockets to accommodate electronic components, by a method such as an air pressure molding method or a vacuum molding method. And, it is made of one or more resins selected from a polystyrene resin, a polycarbonate resin and a polyester resin. These resins may be blended to form a single layer structure, but for example, it may be of a layered structure such that both surface layers are polycarbonate resin layers, and the center is a polystyrene resin layer. Further, for the purpose of preventing a trouble by static electricity, it is also possible to employ an embossed tape having an antistatic performance. To provide such an antistatic performance, carbon black or an antistatic agent may be incorporated or applied on the surface of the embossed tape.

Another application of the cover tape of the present invention may, for example, be a carrier which comprises a square hole-punched carrier tape having square holes punched to receive components, a bottom cover tape to cover the lower side of the square holes of the square hole-punched carrier tape, and a top cover tape to cover the upper side of the square holes of the square hole-punched carrier tape. In such a carrier, the cover tape for transporting electronic components of the present invention may be used as the top cover tape.

The cover tape for transporting electronic components of the present invention is useful for transporting a wide range of chip type electronic components including resistors such as chip fixed resistors, or capacitors such as laminated ceramic capacitors, in the above-mentioned application mode.

The carrier tape system in the present invention is a system for transporting/mounting electronic components, wherein electronic components are accommodated in an embossed tape as mentioned above, the above cover tape is heat-sealed to the embossed tape to cover them, and while peeling the cover tape by a mounting machine called a mounter, the components are mounted on a substrate. By the carrier tape system of the present invention, even when electronic components having metal portions are accommodated and stored in a high temperature and high humidity environment for a long period of time, no corrosion of the electronic components will occur, and a proper peel strength can be constantly obtained at the time of peeling the cover tape when the electronic components are to be taken out.

EXAMPLES

Now, the present invention will be described in further detail with reference to Examples and Comparative Examples. However, it should be understood that the present invention is by no means restricted by such specific Examples.

Example 1-1

A resin mixture comprising 15 parts by mass of a styrene/butadiene copolymer (tradename: STR1602, manufactured by JSR) having a styrene content of 40 mass %, 37 parts by mass of a low density polyethylene (tradename: Sumikathene L705, manufactured by Sumitomo Chemical Co., Ltd.) 10 parts by mass of an impact resistant polystyrene (tradename: H870, manufactured by Toyo-Styrene Co., Ltd.) and 38 parts by mass of a styrene/butadiene copolymer (tradename: L760, manufactured by Denki Kagaku Kogyo K.K.) having a styrene content of 80 mass %, was prepared and by a T-die method, formed into a heat sealing layer film having a thickness of 30 μm. At that time, the film was contacted to an embossing roll to impart a surface roughness (Ra) of 0.4 μm on the surface to constitute outside of a cover tape. This film and a biaxially stretched polyethylene terephthalate film were subjected to extrusion sandwich lamination with a molten low density polyethylene to prepare a laminated film. On both sides of this laminated film, a solution having an amphoteric antistatic agent (tradename: JURYMER, manufactured by Nihon Junyaku Co., Ltd.) as an antistatic agent diluted with pure water 20 times (a 5 mass % solution) to which benzotriazole as an anticorrosive agent was added in an amount of 1 part by mass, was applied in a thickness of 0.2 μm, followed by drying to obtain a cover tape.

Using the obtained cover tape, the following measurements were carried out.

(1) Measurement of Surface Resistivity

In accordance with JIS K-6911, the surface resistivity on the heat sealing layer side was measured at 23° C. in an environment of a relative humidity of 50% at an applied voltage of 500 V for a measuring time of 60 seconds. Usually, the surface resistivity required to obtain an antistatic property of a cover tape is at most $1 \times 10^{12} \Omega/\square$.

(2) Comparison of Corrosiveness to Metal

In an accelerated environment (at 60° C. under a relative humidity of 90%), a small piece of Kovar was placed on the heat sealing layer side of the cover tape, and observation of the appearance of the contact surface with the cover tape was carried out every 24 hours. The observation of the appearance was carried out by a stereomicroscope under 20 magnifications, and comparison was made with the surface not in contact with the cover tape, a color change to reddish brown was observed, and the time until such a color change was measured. Here, it was confirmed that if no color change was observed in 192 hours under such an accelerated environment, no such a color change would be observed over a period of half a year when it was practically used in a market.

(3) Stability of Peel Strength

The above cover tape was heat-sealed under the following conditions by means of a heat sealing machine, to a carrier tape having a width of 24 mm, formed by using DENKA EC sheet, and peeling was carried out at a rate of 300 mm/min, whereby the peel strength was measured. Under such conditions, one having a peel strength of less than 0.4 N, does not have practically sufficient sealing property.

Pallet width: 0.5 mm×2 pallets
Sealing pressure: 0.34 MPa
Sealing temperature and time: 160° C. for 0.5 second
Sealing times: twice

Example 1-2

A cover tape was prepared in the same manner as in Example 1-1 except that an anion type antistatic agent (tradename: ELECTROSTRIPPER, manufactured by Kao Corporation) was used as an antistatic agent, and evaluation was carried out in the same manner.

Example 1-3

A cover tape was prepared in the same manner as in Example 1-1 except that carboxybenzotriazole was used as an anticorrosive agent, and evaluation was carried out in the same manner.

Comparative Example 1-1

A cover tape was prepared in the same manner as in Example 1-1 except that no antistatic agent was applied, and evaluation was carried out in the same manner.

The results of evaluation in Examples 1-1 to 1-3 and Comparative Examples 1-1, were summarized in Table 1.

TABLE 1

|  | Example 1-1 | Example 1-2 | Example 1-3 | Comparative Example 1-1 |
|---|---|---|---|---|
| Surface resistivity |  |  |  |  |
| Substrate surface | $5 \times 10^9 \Omega/\square$ | $6 \times 10^9 \Omega/\square$ | $7 \times 10^{10} \Omega/\square$ | At least $10^{14} \Omega/\square$ |
| Sealant surface | $5 \times 10^9 \Omega/\square$ | $7 \times 10^9 \Omega/\square$ | $5 \times 10^{10} \Omega/\square$ | At least $10^{14} \Omega/\square$ |
| Time until corrosion started | 288 hours | 264 hours | 264 hours | 396 hours |
| Peel strength | 0.6 N | 0.5 N | 0.6 N | 0.8 N |

Example 2-1

A resin mixture comprising 15 parts by mass of a styrene/butadiene copolymer (tradename: STR1602, manufactured by JSR) having a styrene content of 40 mass %, 37 parts by mass of a low density polyethylene (tradename: Sumikathene L705, manufactured by Sumitomo Chemical Co., Ltd.) 10 parts by mass of an impact resistant polystyrene (tradename: H870, manufactured by Toyo-Styrene Co., Ltd.) and 38 parts by mass of a styrene/butadiene copolymer (tradename: L760, manufactured by Denki Kagaku Kogyo K.K.) having a styrene content of 80 mass %, was prepared and by a T-die method, formed into a heat sealing layer film having a thickness of 30 μm. This film and a biaxially stretched polyethylene terephthalate film were subjected to extrusion sandwich lamination with a molten low density polyethylene to prepare a laminated film. On both surfaces of the laminated film, 0.2 μm of a solution (a 5 mass % solution) obtained by adding 2 parts by mass of polyoxyethylene oleyl ether and 20 parts by mass of benzotriazole to 78 parts by mass of an amphoteric ion type antistatic agent SAT-6C (manufactured by Nihon Junyaku Co., Ltd.) containing 50 mass % of a quaternary ammonium salt as an antistatic agent, and diluting the mixture 20 times with pure water, was applied and dried to obtain a cover tape.

Using the obtained cover tape, (1) measurement of the surface resistivity, (2) comparison of corrosiveness to metal, and (3) measurement of the stability of peel strength were carried out in the same manner as in Example 1-1. Here, in the comparison of corrosiveness to metal, evaluation was carried out in the accelerated environment for 336 hours.

Example 2-2

A cover tape was prepared in the same manner as in Example 2-1 except that as the amphoteric ion type antistatic agent containing 20 mass % of a quaternary ammonium salt, SAT-4C (manufactured by Nihon Junyaku Co., Ltd.) was used, and evaluation was carried out in the same manner.

Example 2-3

A cover tape was prepared in the same manner as in Example 2-1 except that carboxybenzotriazole was used as an anticorrosive agent, and evaluation was carried out in the same manner.

Example 2-4

A cover tape was prepared in the same manner as in Example 2-1 except that the amount of polyoxyethylene oleyl ether was changed to 10 parts by weight, and evaluation was carried out in the same manner.

Example 2-5

A cover tape was prepared in the same manner as in Example 2-1 except that the amount of benzotriazole was changed to 10 parts by weight, and evaluation was carried out in the same manner.

Comparative Example 2-1

A cover tape was prepared in the same manner as in Example 2-1 except that the antistatic layer was formed without adding benzotriazole to an antistatic agent, and evaluation was carried out in the same manner.

The results of evaluation in Examples 2-1 to 2-5 and Comparative Examples 2-1 are summarized in Tables 2.

TABLE 2

| | Example 2-1 | Example 2-2 | Example 2-3 | Example 2-4 | Example 2-5 | Comparative Example 2-1 |
|---|---|---|---|---|---|---|
| Composition of antistatic layer (mass %) | | | | | | |
| Quaternary ammonium salt | 50 | 20 | 50 | 50 | 50 | 50 |
| Polyoxyethylene oleyl ether | 2 | 2 | 2 | 10 | 2 | 2 |
| Benzotriazole | 20 | 20 | — | 20 | 10 | — |
| Carboxybenzotriazole | — | — | 20 | — | — | — |
| Surface resistivity | | | | | | |
| Substrate surface | $2 \times 10^9\ \Omega/\square$ | $8 \times 10^9\ \Omega/\square$ | $6 \times 10^9\ \Omega/\square$ | $9 \times 10^9\ \Omega/\square$ | $1 \times 10^9\ \Omega/\square$ | $2 \times 10^9\ \Omega/\square$ |
| Sealant surface | $2 \times 10^9\ \Omega/\square$ | $8 \times 10^9\ \Omega/\square$ | $6 \times 10^9\ \Omega/\square$ | $8 \times 10^9\ \Omega/\square$ | $1 \times 10^9\ \Omega/\square$ | $2 \times 10^9\ \Omega/\square$ |
| Time until corrosion started | 396 hours | 360 hours | 336 hours | 396 hours | 336 hours | 120 hours |
| Stability of peel strength (strength) | 0.6 N | 0.6 N | 0.5 N | 0.4 N | 0.6 N | 0.6 N |

Note:
The main residual component in the composition of the antistatic layer is the residual component contained in the commercial antistatic agent used.

Example 3-1

A resin mixture (for a heat sealing layer) comprising 45 parts by mass of a styrene/butadiene copolymer ("CLEAREN" manufactured Denki Kagaku Kogyo K.K.) having a styrene content of 30 mass %, 45 parts by mass of a polyolefin resin ("TAFMER", manufactured Mitsui Chemicals, Inc.) and 10 parts by mass of an impact resistant polystyrene ("HI-E6", manufactured by Toyo Styrene Co., Ltd.) was prepared, and together with a resin mixture (for a support layer) comprising 60 parts by mass of a polyolefin resin ("TAFMER", manufactured by Mitsui Chemicals, Inc.) and 40 parts by mass of a low density polyethylene ("UBE polyethylene", manufactured by Ube Industries, Ltd.), a double layer film of heat sealing layer/polyolefin resin layer comprising 10 μm of a heat sealing layer and 20 μm of a support layer and having a total thickness of 30 μm, was prepared by a T-die coextrusion method. At that time, the film extruded by the T-die was withdrawn while being sandwiched between a mat roll made of silicon rubber and a cooling roll made of metal (heat sealing layer side) having the surface roughness (Ra) adjusted to 0.8 μm. The surface roughness (Ra) on the heat sealing layer side of the obtained double layer film was 0.4 μm. This double layer film was laminated on a biaxially stretched polyethylene terephthalate film (substrate layer)

having a thickness of 20 μm so that the surface on the polyolefin resin layer side of the double layer film was the laminated surface, via a melt-extruded low density polyethylene, by extrusion lamination, to obtain a laminated film. On both surfaces of this laminated film, a solution (5 mass % solution) obtained by diluting an amphoteric ion type antistatic agent SAT (manufactured by Nihon Junyaku Co., Ltd.) as an antistatic agent, 20 times with pure water, was applied so that the thickness after drying would be about 0.1 μm, and dried to obtain a cover tape.

Using the obtained cover tape, (1) measurement of the surface resistivity, (2) comparison of corrosiveness to metal (symbol X indicates one where formation of a foreign matter was observed before expiration of 396 hours, and symbol ○ indicates one where no such formation was observed), and (3) measurement of the stability of peel strength, were carried out in the same manner as in Example 1-1, and in addition, measurements were carried out with respect to the following two items. The results of the measurements are summarized in Tables 3-1 and 3-2.

(4) Measurement of Surface Roughness

Using a surface roughness measuring apparatus SJ-301, manufactured by Mitsutoyo-Kiko Co., Ltd., the average surface roughness (Ra) of the heat sealing layer side of the cover tape was measured in accordance with JIS B-0651.

(5) Transparency

Using a haze meter in accordance with measurement method A by JIS K7105 (1998), the haze (%) of the cover tape was measured.

Example 3-2

A cover tape was prepared in the same manner as in Example 3-1 except that at the time of preparing the double layer film of heat sealing layer/polyolefin resin layer, a pinch roll having an average surface roughness (Ra) of 1.4 μm, was used.

Example 3-3

A cover tape was prepared in the same manner as in Example 3-1 except that at the time of preparing the double layer film of heat sealing layer/polyolefin resin layer, the thickness of the heat sealing layer was made to be 20 μm, and the thickness of the polyolefin resin layer was made to be 10 μm.

Example 3-4

A cover tape was prepared in the same manner as in Example 3-1 except that as the resin for the heat sealing layer, a mixture comprising an ethylene/ethyl acrylate polymer and a styrene/butadiene copolymer having a styrene content of 30 mass %, was employed.

Comparative Example 3-1

A cover tape was prepared in the same manner as in Example 3-1 except that at the time of preparing the double layer film of heat sealing layer/polyolefin resin layer, a specular surface roll was employed as the pinch roll for withdrawal.

Comparative Example 3-2

A cover tape was prepared in the same manner as in Example 3-1 except that at the time of preparing the double layer film of heat sealing layer/polyolefin resin layer, a pinch roll for withdrawal having an average surface roughness (Ra) of 3.0 μm was used.

Comparative Example 3-3

A cover tape was prepared in the same manner as in Example 3-1 except that no antistatic agent was applied.

EVALUATION METHODS

Using the cover tapes prepared in the above Examples and Comparative Examples, evaluation was carried out in the same manner as mentioned above, and the evaluation results are summarized in Tables 3-1 and 3-2.

Here, measurement of the surface resistivity, comparison of corrosiveness to metal (symbol X indicates one where formation of a foreign matter was observed before expiration of 396 hours, and symbol ○ indicates one where no such formation was observed), and measurement of the stability of peel strength, were carried out in the same manner as in Example 1-1.

TABLE 3-1

| | Example 3-1 | Example 3-2 | Example 3-3 | Example 3-4 |
|---|---|---|---|---|
| Thickness of heat sealing layer | 10 μm | 10 μm | 20 μm | 10 μm |
| Thickness of support layer | 20 μm | 20 μm | 10 μm | 20 μm |
| Average surface roughness (Ra) (Heat sealing layer) | 0.4 μm | 0.7 μm | 0.4 μm | 0.4 mum |
| Surface resistivity | | | | |
| Substrate surface | $5 \times 10^9 \, \Omega/\square$ | $5 \times 10^9 \, \Omega/\square$ | $4 \times 10^9 \, \Omega/\square$ | $8 \times 10^9 \, \Omega/\square$ |
| Sealant surface | $5 \times 10^9 \, \Omega/\square$ | $7 \times 10^9 \, \Omega/\square$ | $5 \times 10^9 \, \Omega/\square$ | $7 \times 10^9 \, \Omega/\square$ |
| Corrosiveness to metal | ○ | ○ | ○ | ○ |
| Transparency (haze) | 17% | 22% | 28% | 20% |
| Peel strength | 0.6 N | 0.5 N | 0.6 N | 0.5 N |

TABLE 3-2

|  | Comparative Example 3-1 | Comparative Example 3-2 | Comparative Example 3-3 |
|---|---|---|---|
| Thickness of heat sealing layer | 10 μm | 10 μm | 10 μm |
| Thickness of support layer | 20 μm | 20 μm | 20 μm |
| Average surface roughness (Ra) (Heat sealing layer) | 0.1 μm | 1.5 μm | 0.4 μm |
| Surface resistivity | | | |
| Substrate surface | $5 \times 10^9$ Ω/□ | $4 \times 10^9$ Ω/□ | $>10^{12}$ Ω/□ |
| Sealant surface | $4 \times 10^9$ Ω/□ | $5 \times 10^9$ Ω/□ | $>10^{12}$ Ω/□ |
| Corrosiveness to metal | X | ○ | ○ |
| Transparency (haze) | 15% | 40% | 15% |
| Peel strength | 0.5 N | 0.5 N | 0.8 N |

The entire disclosures of Japanese Patent Application No. 2004-129131 filed on Apr. 26, 2004, Japanese Patent Application No. 2004-185262 filed on Jun. 23, 2004, and Japanese Patent Application No. 2004-307675 filed on Oct. 22, 2004 including specifications, claims and summaries are incorporated herein by reference in their entireties.

The invention claimed is:

1. A cover tape comprising at least a substrate layer, heat sealing layer and an antistatic layer, wherein (1) the antistatic layer comprising an antistatic agent and an anticorrosive agent, is formed on the heat sealing layer, and/or (2) (i) the heat sealing layer side opposite to the substrate layer has an average surface roughness (Ra) of from 0.3 to 1.0 μm, and (ii) the antistatic layer comprising an antistatic agent is formed on the heat sealing layer, wherein the antistatic layer comprises (a) an amphoteric ion surfactant quaternary ammonium salt, (b) a polyoxyethylene alkyl ether and (c) a benzotriazole compound.

2. The cover tape according to claim 1, wherein the antistatic layer comprises from 20 to 70 mass % of the component (a), from 1 to 10 mass % of the component (b) and from 10 to 40 mass % of the component (c).

3. A cover tape comprising at least a substrate layer, heat sealing layer and an antistatic layer, wherein (1) the antistatic layer comprising an antistatic agent and an anticorrosive agent, is formed on the heat sealing layer, and/or (2) (i) the heat sealing layer side opposite to the substrate layer has an average surface roughness (Ra) of from 0.3 to 1.0 μm, and (ii) the antistatic layer comprising an antistatic agent is formed on the heat sealing layer, which is a laminated film comprising the substrate layer having a thickness of from 5 to 30 μm, an interlayer composed mainly of a polyethylene resin and having a thickness of from 5 to 25 μm, a support layer composed mainly of a polyolefin resin and having a thickness of from 5 to 25 μm and the heat sealing layer having a thickness of from 5 to 20 μm, wherein the average surface roughness (Ra) of the cover tape on the heat sealing layer side opposite to the substrate is from 0.3 to 1.0 μm, and the antistatic layer comprising the antistatic agent is formed on the heat sealing layer.

4. The cover tape according to claim 3, wherein the heat sealing layer is made of a thermoplastic composition comprising an ethylene polymer (A), a styrene-butadiene copolymer (B) and an impact resistant polystyrene (C).

5. The cover tape according to claim 3, wherein the thickness of the antistatic layer formed on the heat sealing layer is from 0.01 to 0.2 μm.

6. The cover tape according to claim 3, wherein the surface resistivity of the surface on the heat sealing layer side is at most 1×1012Ω/□.

* * * * *